P. L. WOOSTER.
PROCESS FOR CLEANING FILTERS IN CONNECTION WITH THE PURIFICATION OF SUGAR, OILS, AND CHEMICALS.
APPLICATION FILED AUG. 17, 1916.
1,240,290.
Patented Sept. 18, 1917.
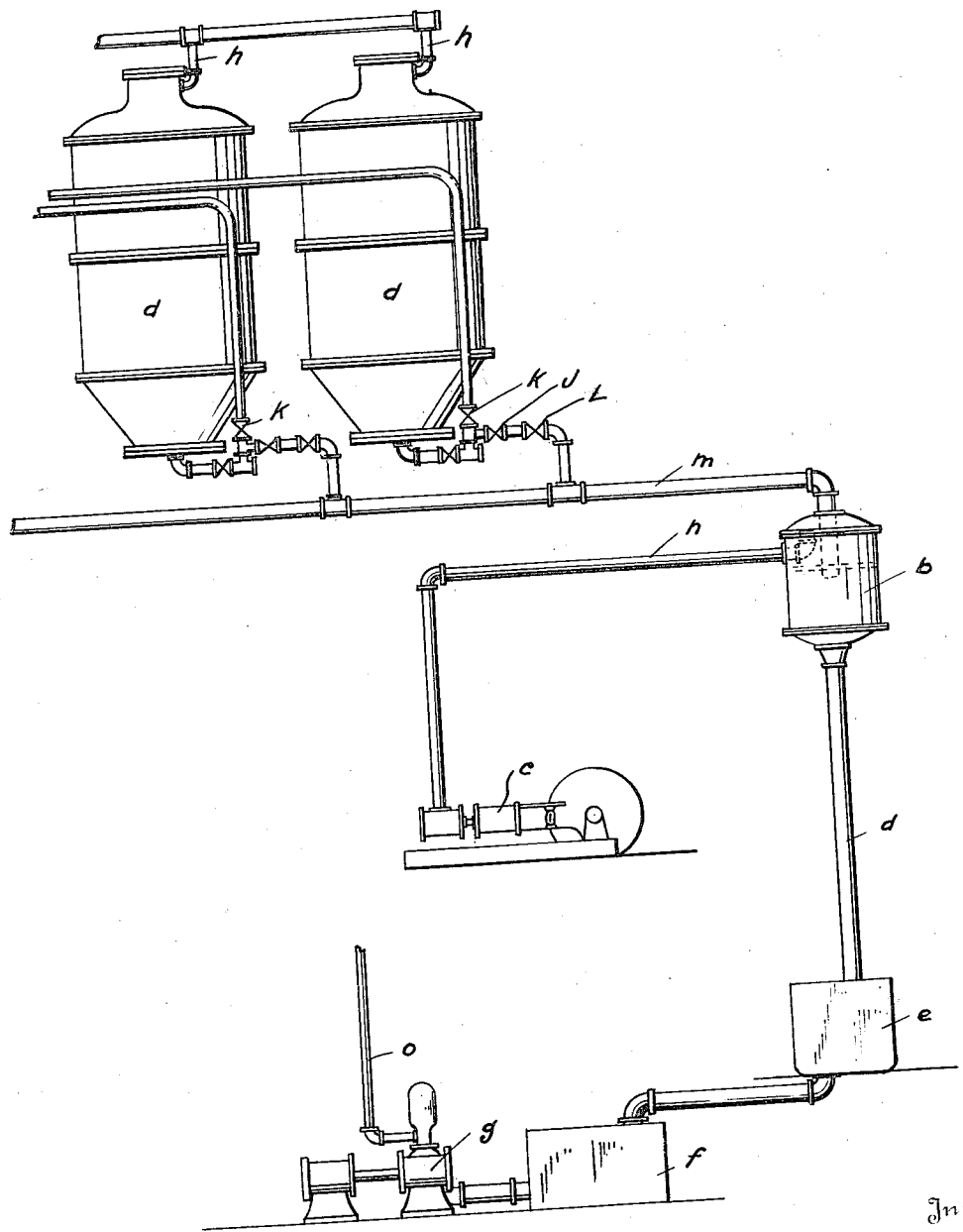
Inventor
P. L. Wooster.
By C. L. Parker.
Attorney

UNITED STATES PATENT OFFICE.

PHILIP L. WOOSTER, OF YONKERS, NEW YORK.

PROCESS FOR CLEANING FILTERS IN CONNECTION WITH THE PURIFICATION OF SUGAR, OILS, AND CHEMICALS.

1,240,290.

Specification of Letters Patent.

Patented Sept. 18, 1917.

Application filed August 17, 1916. Serial No. 115,480.

*To all whom it may concern:*

Be it known that I, PHILIP L. WOOSTER, a citizen of the United States, and resident of Yonkers, Westchester county, New York, have made a certain new and useful Invention Relating to Processes for Cleaning Filters in Connection with the Purification of Sugar, Oils, and Chemicals, of which the following is a specification.

My invention relates to the manufacture of sugar, oils and chemicals, and has for its object the simplification and rendering more efficient of the process of cleaning the filters used for purifying sugar, oils and chemicals.

Heretofore in the manufacture of sugar, the raw sugar has been passed through filters usually contained in cylindrical tanks filled with bone char or similar material. The liquid is fed into the top of the filter, passes through the filtering medium by gravity and flows from the bottom of the filter. The filtering medium absorbs the impurities in the sugar that give it color, and the sugar that flows from the bottom of the filter is of light color. After a certain period of time, however, the pores of the filtering medium become clogged and its filtering power becomes exhausted and the decolorization process does not continue, or continues imperfectly. It is then necessary to shut off the supply of unpurified liquor and clean the filtering medium in the filter. Heretofore this has been done by continuously feeding water into the top of the filter which drives down the heavy sugar as well as the impurities with which the filtering medium became clogged. In the manufacture of sugar it has heretofore been found necessary to wash the bone char or other filtering medium for a period of many hours in order satisfactorily to cleanse it. The water that is used for this cleansing process is, in particular during the first part of the washing process, heavily charged with sugar as it flows from the bottom of the filter. The water so charged with sugar is known as "sweet water" and owing to its contents of sugar is evaporated in suitable evaporating tanks, thus allowing a considerable portion of sugar to be recovered. In spite of the expense of evaporating the sweet water, the greater part of the water used for the washing process has been, according to former practice, evaporated and the sugar contents recovered.

In the purification of oils and various chemicals requiring filtration through bone char or similar filtering medium, similar conditions have existed. After a certain period of filtering, the filtering medium becomes more or less inactive and the bone char or other filtering material has to be cleansed by washing with water, spirits or other liquid. The washing liquor flowing from the bottom of the filter during the greater portion of the washing process is evaporated and the oil or chemical is recovered.

My process materially reduces the period necessary for the cleansing of the filter, so that, for example, the cleansing of filters used for filtering sugar can be accomplished in approximately one-half the time required by the old method. Furthermore my process extracts from the bone char or other filtering medium a large proportion of the sugar liquor or other material before it is necessary to add water, spirits or other liquid. The sugar liquor, oil or other material thus removed does not need to be evaporated before proceeding with the next operation and the proportion of sugar, oil or other material removed from the bone char by the wash liquor is so small in my process that the evaporating that is necessary in connection with my process is of short duration and inexpensive as compared with the former process.

In the accompanying drawings I have illustrated one form of apparatus that can be used in practising my process. *a a* are cylindrical filter tanks which are ordinarily nearly filled with bone char. *h h* are feed pipes through which the raw sugar, oil or chemical to be decolorized is fed into the filter tanks. The sugar, oil or other material filters through the bone char and passes out at the bottom of the filters *a a* and is carried off through the pipes *i i* to suitable tanks or vats (not shown). When in the usual practice prior to my invention, the bone char became more or less inactive by reason of clogging of the pores, the supply of raw sugar or other material passing into the filter tanks through the pipes *h h* was cut off and in place thereof water, spirits or other liquid was introduced which flowed by gravity through the bone char or other filtering material, passing out at the bottom of the tanks through the pipes $i\ i$ into suitable evaporators where the "sweet water" or other diluted oil or chemical would be evaporated. In the practice of my process I attach to the outlet pipe of each filter tank a pipe line $m$ which may be connected to the outlet of the tank by a quick opening valve $j$ and if desired also by a gate valve $l$ which connects with the wash liquor pipe $m$. The outlet pipes $i\ i$ may be provided with gate valves $k\ k$. The wash liquor pipe $m$ in turn connects with the vacuum tank $b$ in which vacuum can be produced by the withdrawal of the air through the pipe $n$ by the vacuum pump $c$. $d$ is a barometric column which connects the vacuum tank $b$ with the sealed tank $e$, which tank is in turn connected by means of a suitable pipe with the liquor tank $f$ from which the liquor can be pumped by the pump $g$ through the pipe $o$ to tanks, vats or evaporators as desired.

My process is practised as follows: When the liquor flowing from the bottom of the filter tanks $a\ a$ is discolored and shows that the bone char or other filtering material is no longer decolorizing to the desired extent I shut off the supply of raw material through the pipes $h\ h$ but instead of supplying water, spirits or other liquid to the filtering material in the tanks I close the valve $k$ and open the valves $j\ l$ and by means of the pump $c$ create vacuum in the tank $b$. The suction thereby produced draws from the bone char or other filtering material in the filter tanks $a\ a$ considerable proportion of the sugar liquor, oil or chemical remaining in the filtering material. The sugar liquor, oil or chemical passes through the tank $b$, column $d$, sealed tank $e$, into the liquor tank $f$, from which it is pumped by the pump $g$ through the pipe $o$ into vats or other receptacles for the sugar, oil or chemical.

A comparatively short application of the suction will serve to withdraw nearly all of the sugar liquor, oil or chemical that is loosely held in the bone char or other filtering material, leaving behind only such material as is closely held in the pores of the bone char or other filtering medium. In this way a large percentage—in the case of sugar often as large as 70%—of the raw material can thus be extracted in a very short time from the filtering medium. As no water, spirits or other liquid has been used in removing this proportion of the raw material, it need not be subjected to any evaporation process, but, if sufficiently decolorized, can be discharged through the pipes $o$ into the vats containing the decolorized material, or if not sufficiently decolorized can be returned through the pipes $o$ to the vats or tanks containing the raw material.

When further application of suction fails to bring a satisfactory flow of material from the filter, I supply water, spirits or other liquid through the pipes $h\ h$ either allowing the same to flow through the filtering medium by gravity, in which instance the valves $k\ k$ are open and the wash liquor flows out of the tanks through the pipes $i\ i$ into a suitable evaporator (not shown), or aiding the flow of the liquid through the filtering material by applying suction in the manner above described, in which latter case the valves $k\ k$ are closed, the valves $j\ l$ are opened and the wash liquor flows through the pipe $m$, the tank $b$, the column $d$, the tank $e$ and into the tank $f$ from which it is pumped by the pump $g$ through the pipe $o$ into a suitable evaporator (not shown) where it can be evaporated in the usual manner.

Having by the original application of suction to the filter tanks, before supplying liquid thereto, removed from the filtering medium the larger percentage of the sugar or other material remaining in the pores of the bone char or other filtering medium, the remaining sugar liquor or other material can be washed therefrom by a comparatively short application of water, spirits or other liquid. The entire cleansing of bone char filter tanks used in the manufacture of sugar can be accomplished by my process in about half the time as compared with the former methods, and a similar saving of time can be accomplished in the cleansing of similar filters used in the purification of oils and chemicals. As the larger proportion of the sugar, oil or other material remaining in the exhausted filtering medium is, under my process, removed without the use of water, spirits or other liquid, it therefore does not have to be evaporated. The evaporation of the wash liquor by my process requires far less time and expenditure of heat and energy than under the former methods. In this way my process not only materially lessens the time and expense of cleaning the filters, but also lessens the time that the filters are out of use. My process also materially lessens the expense heretofore incident to the recovery of sugar, oil or chemical from the "sweet water" or other wash liquor passing from the bottom of the filters during the cleansing process, and it also materially increases the amount of purified material recovered, both because it permits of the recovery of the larger proportion of the raw material in the filter without requiring the addition of liquid and also because it permits the manufacturer to resume manufacturing operations with the filter so much sooner than under the former methods.

If desired suction may be applied or air otherwise passed under pressure through the filtering material simultaneously with the application of water or other liquid in the washing process above described which applies such liquid in a process which is an integral element of the complete washing process.

It is to be understood that there is apparatus known to the drawings and is only illustrative of apparatus that may be used in carrying out the processes, that other apparatus or equipment and mechanical expedients may be employed to accomplish the purposes described without departing from the spirit of my invention which is set forth in the following claims:

1. The herein described process of cleansing fluid soiled during use substantially devoid of which are extraneous to ecological by a liquid composed of the constituents thereof, which consists in subjecting the lower portion of the fluid to be cleaned, with the substantial depth thereof in communication with a suitable degree of vacuum, to withdrawing the clogging material from the lower portion of the fluid, continuing the action of the vacuum upon said lower portion to gradually withdraw the clogging material from the upper portion of the fluid to the lower portion, continuing such application of vacuum until...

2. The herein described process of cleansing fluid soiled during use substantially devoid of which are extraneous to ecological by a liquid composed of the constituents thereof, which consists in subjecting the lower portion of the fluid to be cleaned, with the substantial depth thereof in communication with a suitable degree of vacuum, to withdrawing the clogging material from the lower portion of the fluid, continuing the action of the vacuum...

upon such lower portion to gradually withdraw the clogging material from such lower portion of the fluid, and then applying to an upper portion and supplying to an upper portion of the fluid to be cleansed.

3. The herein described process of cleansing fluid soiled during use, substantially devoid of which are extraneous to ecological by a liquid composed of the constituents thereof, which consists in subjecting the lower portion of the fluid to be cleaned, with the substantial depth thereof in communication with a suitable degree of vacuum, to withdraw the clogging material from the lower portion of the fluid, and applying a supply of cleansing liquid to the upper portion of the fluid while the lower portion thereof is subject to the action of the vacuum.

4. The herein described process of cleansing fluid soiled during use substantially devoid of which are extraneous to ecological by a liquid composed of the constituents thereof, which consists in subjecting the lower portion of the fluid to be cleaned, with the substantial depth thereof in communication with a suitable vacuum, to withdrawing the clogging material from the lower portion of the fluid, gradually withdrawing the clogging material from the upper portion of the fluid to the lower portion, and subsequently supplying a cleansing liquid to the upper portion of the fluid.

PHILIP LWOOTERS.